United States Patent
Hofer et al.

[11] Patent Number: 6,074,772
[45] Date of Patent: Jun. 13, 2000

[54] HIGH TEMPERATURE FUEL CELL, HIGH TEMPERATURE FUEL CELL STACK AND METHOD FOR PRODUCING A HIGH TEMPERATURE FUEL CELL

[75] Inventors: Gerhard Hofer, Röttenbach; Belinda Brückner, Altdorf; Wilhelm Kleinlein, Fürth; Harald Schmidt, Erlangen, all of Germany

[73] Assignee: Siemens Aktiengesellschaft, Munich, Germany

[21] Appl. No.: 09/009,562

[22] Filed: Jan. 20, 1998

[30] Foreign Application Priority Data

Jul. 21, 1995 [DE] Germany .................. 195 26 722

[51] Int. Cl.⁷ .................. H01M 4/86; H01M 2/00
[52] U.S. Cl. .................. 429/40; 429/34; 429/41; 429/42; 429/44; 429/45
[58] Field of Search .................. 429/40, 41, 42, 429/44, 45, 34

[56] References Cited

U.S. PATENT DOCUMENTS

| | | | |
|---|---|---|---|
| 4,554,225 | 11/1985 | Sounai et al. | 429/34 |
| 4,857,420 | 8/1989 | Maricle et al. | 429/30 |
| 5,034,288 | 7/1991 | Bossel . | |
| 5,614,331 | 3/1997 | Takeuchi et al. | 429/9 |
| 5,643,690 | 7/1997 | Tateishi et al. | 429/34 |
| 5,702,837 | 12/1997 | Xue | 429/40 |

FOREIGN PATENT DOCUMENTS

| | | |
|---|---|---|
| 0338832A1 | 10/1989 | European Pat. Off. . |
| 0556532A1 | 8/1993 | European Pat. Off. . |
| 3922673A1 | 1/1991 | Germany . |
| 3935722A1 | 5/1991 | Germany . |
| 94/25994 | 11/1994 | WIPO . |

OTHER PUBLICATIONS

Japanese Patent Abstract No. 4315772 (Masamichi et al.), dated Mar. 25, 1993.

Japanese Patent Abstract No. 7240216 (Junichi et al.) dated Sep. 12, 1995.

"Fuel Cell Handbook", A.J. Appleby et al., 1989, pp. 440–454 (no month).

"Brennstoffzellen als Energiewander" (fuel cells as energy transformers), Wolfgang Drenckhan et al., Energiewirtschaftliche Tagesfragen, vol. 43, 1993, No. 6, pp. 382–389 (no month).

"Römpp Chemie Lexikon" (Römpp Chemical Dictionary), Jürgen Falbe et al., Georg Thieme Verlag Stuttgart, New York, pp. 4245–4246 1992 (no month).

*Primary Examiner*—Maria Nuzzolillo
*Assistant Examiner*—Tracy Dove
*Attorney, Agent, or Firm*—Herbert L. Lerner; Laurence A. Greenberg

[57] ABSTRACT

A high temperature fuel cell and a method for producing the same include at least one interconnecting conducting plate which is associated with at least one electrode. A contact layer is disposed between the interconnecting conducting plate and the electrode. The contact layer is produced from an oxide mixed crystal powder which has a spinel structure and also contains, in addition to chromium, a divalent element selected from the group Ti, V, Mn, Fe, Co and Cu. The contact layer has high thermodynamic stability in addition to sufficient electrical conductivity. A high temperature fuel cell stack includes a number of the high temperature fuel cells.

16 Claims, 2 Drawing Sheets

HIGH TEMPERATURE FUEL CELL, HIGH TEMPERATURE FUEL CELL STACK AND METHOD FOR PRODUCING A HIGH TEMPERATURE FUEL CELL

CROSS-REFERENCE TO RELATED APPLICATION

This application is a continuation of International Application Ser. No. PCT/DE96/01282, filed Jul. 15, 1996, which designated the United States.

BACKGROUND OF THE INVENTION

Field of the Invention

The invention relates to a high temperature fuel cell, a high temperature fuel cell stack and a method for producing a high temperature fuel cell.

It is known that, during the electrolysis of water, the water molecules are decomposed by electrical current into hydrogen and oxygen. In fuel cells, that process takes place in reverse. During the electrochemical combination of hydrogen and oxygen into water, electrical current is produced, with high efficiency and without the emission of pollutants and carbon monoxide, when pure hydrogen is used as a combustible gas. Even with technical combustible gases, for example natural gas, and with air instead of pure oxygen, fuel cells produce considerably less pollutants and less $CO_2$ per energy unit because of their high efficiency, than other forms of energy production which operate with fossil energy sources. The technical implementation of the principle of the fuel cell has given rise to a wide variety of solutions, namely with different electrolytes and with operating temperatures of between 80° C. and 1000° C.

In Solid Oxide Fuel Cells (SOFCs), natural gas is used as the primary energy source. The very compact structure permits a power density of 1 $MW/m^3$. Operating temperatures of more than 90° C. are found.

In a high temperature fuel cell stack being formed of high temperature solid electrolyte fuel cells, and also being abbreviated as merely "stack" in the specialist literature, a contact layer, a solid electrolyte electrode element, a further contact layer, a further interconnecting conducting plate, etc. are disposed in that order on one another and below an upper interconnecting conducting plate which covers the high temperature fuel cell stack. The electrolyte/electrode element in that case includes two electrodes and a solid electrolyte disposed between the two electrodes. The interconnecting conducting plates within the high temperature fuel cell stack are constructed therein as bipolar plates. In contrast to an interconnecting conducting plate disposed on the edge of the high temperature fuel cell stack, they are provided on both sides with channels for supplying the solid electrolyte electrode element with an operating medium.

In that case, a solid electrolyte electrode element lying between two neighbouring interconnecting conducting plates, inclusive of the contact layer bearing directly on both sides of the solid electrolyte electrode element and the sides of each of the two interconnecting conducting plates bearing on the contact layer, together form a high temperature fuel cell.

That and other types of fuel cells are, for example, disclosed by the "Fuel Cell Handbook" by A. J. Appelby and F. R. Foulkes, 1989, pages 440 to 454.

Experience has shown that an essential problem in the operation of a high temperature fuel cell is achieving longterm-stable electrical contact between the metallic interconnecting conducting plate and the electrodes of the fuel cell. To that end, use is made of so-called contact layers. To date, ceramic powders of the perovskite system (La, Sr) (Co, Mn)$O_3$ have for that purpose been applied to the metallic interconnecting conducting plate in the form of a paste using a screen printing technique or in the form of a spraying suspension using wet powder spraying. Investigations of that material system have shown that, when Sr-doped material is used, a poorly conductive $SrCrO_4$ layer is formed at the interface between the contact layer and the interconnecting conducting plate. Since the interconnecting conducting plate must be used as a current take-off, that poorly conductive contact layer is unacceptable.

A further problem, besides that of electrical conductivity, is the thermodynamic stability at the operating temperature of the high temperature fuel cell stack. Operating temperatures of more than 900° C. place great demands in terms of thermodynamic stability. There is a further need to avoid undesired phase formation which arises due to the chemical reaction of elements that are present in the contact layer and not in the interconnecting conducting plate or the electrode.

An additional problem is the evaporation of chromium from the chromium-containing interconnecting conducting plate, which leads to degradation of the fuel cell.

SUMMARY OF THE INVENTION

It is accordingly an object of the invention to provide a high temperature fuel cell, a high temperature fuel cell stack having a number of the high temperature fuel cells, and a method for producing the high temperature fuel cell, which overcome the hereinafore-mentioned disadvantages of the heretofore-known devices and methods of this general type and in which the high temperature fuel cell has a contact layer with sufficient electrical conductivity and thermodynamic stability, with no interactions that lead to undesired phase formation.

With the foregoing and other objects in view there is provided, in accordance with the invention, a high temperature fuel cell, comprising at least one electrode; at least one interconnecting conducting plate associated with the at least one electrode; and a contact layer disposed between the at least one interconnecting conducting plate and the at least one electrode; the contact layer produced from an oxide mixed crystal powder having a spinel structure and containing chromium and a divalent element selected from the group consisting of Ti, V, Mn, Fe, Co and Cu.

In accordance with another feature of the invention, the contact layer is a vacuum plasma sprayed layer, a CVD applied layer, a hydrothermal synthesis applied layer or a sol-gel applied layer.

In accordance with a further feature of the invention, the interconnecting conducting plate is a bipolar plate.

With the objects of the invention in view, there is also provided a high temperature fuel cell stack, comprising a number of the high temperature fuel cells.

With the objects of the invention in view, there is additionally provided a method for producing a high temperature fuel cell, which comprises providing at least one electrode; providing at least one interconnecting conducting plate associated with the at least one electrode; applying a contact layer between the at least one interconnecting conducting plate and the at least one electrode; and producing the contact layer from an oxide mixed crystal powder having a spinel structure and containing chromium and a divalent element selected from the group consisting of Ti, V, Mn, Fe, Co and Cu.

In contrast to known perovskite contact layers, this contact layer has sufficient electrical conductivity. At a working temperature of more than 90° C., it is also more thermodynamically stable than contact layers having a perovskite structure. In general, there is a large number of suitable spinels which have sufficient electrical conductivity. In particular, because of their electrical conductivity, $FeCr_2O_4$ spinels are of particular interest for this purpose. When, for example, $CoCr_2O_4$ and $FeCr_2O_4$ mixed crystals are used as a contact layer, there are no other elements in the contact layer than are already found in the metallic interconnecting conducting plate and the electrodes. Substantially no undesired phase formation is therefore to be expected.

In accordance with another mode of the invention, there is provided a method which comprises applying the contact layer as ceramic powder.

In accordance with a further mode of the invention, there is provided a method which comprises applying the ceramic powder by a screen-printing technique.

In accordance with an added mode of the invention, there is provided a method which comprises applying the ceramic powder by wet powder spraying.

In accordance with an additional mode of the invention, there is provided a method which comprises placing the contact layer directly on the at least one interconnecting conducting plate. This substantially prevents the evaporation of chromium from the chromium-containing interconnecting conducting plate.

In accordance with yet another mode of the invention, there is provided a method which comprises placing the contact layer on the at least one interconnecting conducting plate by vacuum plasma spraying.

In accordance with yet a further mode of the invention, there is provided a method which comprises placing the contact layer on the at least one interconnecting conducting plate by a CVD method.

In accordance with yet an added mode of the invention, there is provided a method which comprises placing the contact layer on the at least one interconnecting conducting plate by hydrothermal synthesis.

In accordance with a concomitant mode of the invention, there is provided a method which comprises placing the contact layer on the at least one interconnecting conducting plate by a sol-gel method.

Other features which are considered as characteristic for the invention are set forth in the appended claims.

Although the invention is illustrated and described herein as embodied in a high temperature fuel cell, a high temperature fuel cell stack and a method for producing a high temperature fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
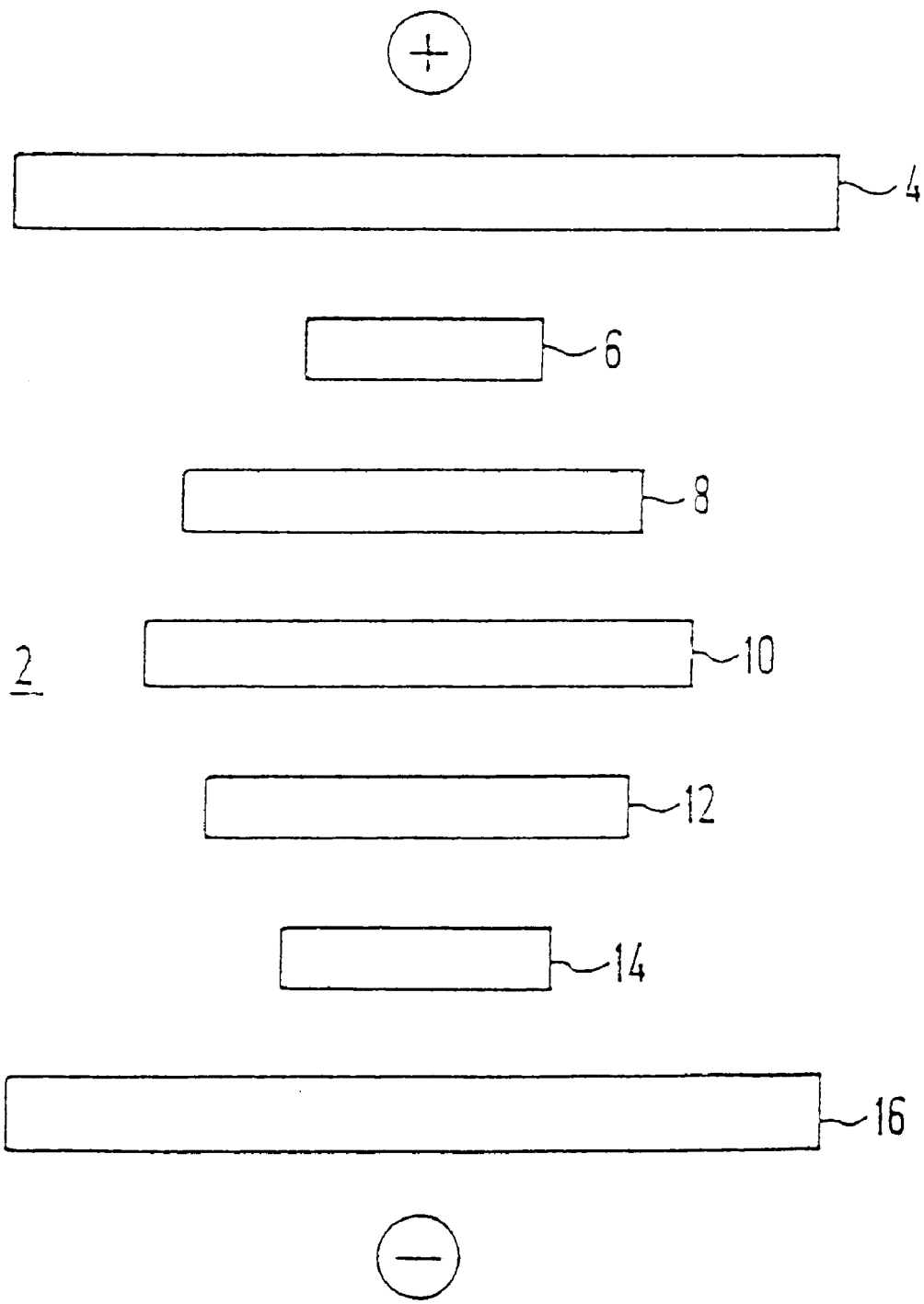
FIG. 1 is a diagrammatic, cross-sectional view of a high temperature fuel cell.

Referring now to the figures of the drawings in detail and first, particularly, to FIG. 1 thereof, there is seen a high temperature fuel cell 2 which includes an interconnecting conducting plate 4, a contact layer 6, an electrode 8 configured as a cathode, an electrolyte 10, an electrode 12 configured as an anode, a contact layer 14 and an interconnecting conducting plate 16, which are stacked on one another in the order indicated. The interconnecting conducting plates 4 and 16 are formed of a metallic chromium-containing compound.

The contact layer 6 applied between the interconnecting conducting plate 4 and the electrode 8, and the contact layer 14 applied between the interconnecting conducting plate 16 and the electrode 12, are produced from an oxide mixed crystal powder which has a spinel structure and also contains, in addition to chromium, a divalent element selected from the group Ti, V, Mn, Fe, Co and Cu.

The contact layers 6, 14 can be applied as a ceramic powder, for example in the form of a paste, on the respective interconnecting conducting plates 4, 16 by using a screen printing technique, or as a suspension by using wet powder spraying. Since the contact layers 6 and 14 are applied directly on the respective interconnecting conducting plates 4, 16, it is possible to substantially prevent the evaporation of chromium from the metallic chromium-containing interconnecting conducting plates 4, 16. The evaporation of the chromium would lead to a degradation of the high temperature fuel cell system.

Vacuum plasma spraying, a CVD method, hydrothermal synthesis or a sol-gel method may, for example, be used as a preferred coating method.

The use of $FeCr_2O_4$ or $CoCr_2O_4$ mixed crystals has the particular advantage of ensuring that there are no other elements in the contact layer 6, 14 which are not already contained in the metallic chromium-containing interconnecting conducting plates 4, 16. There is therefore little or no likelihood of interactions which otherwise lead to undesired phase formation.

Figure 2:
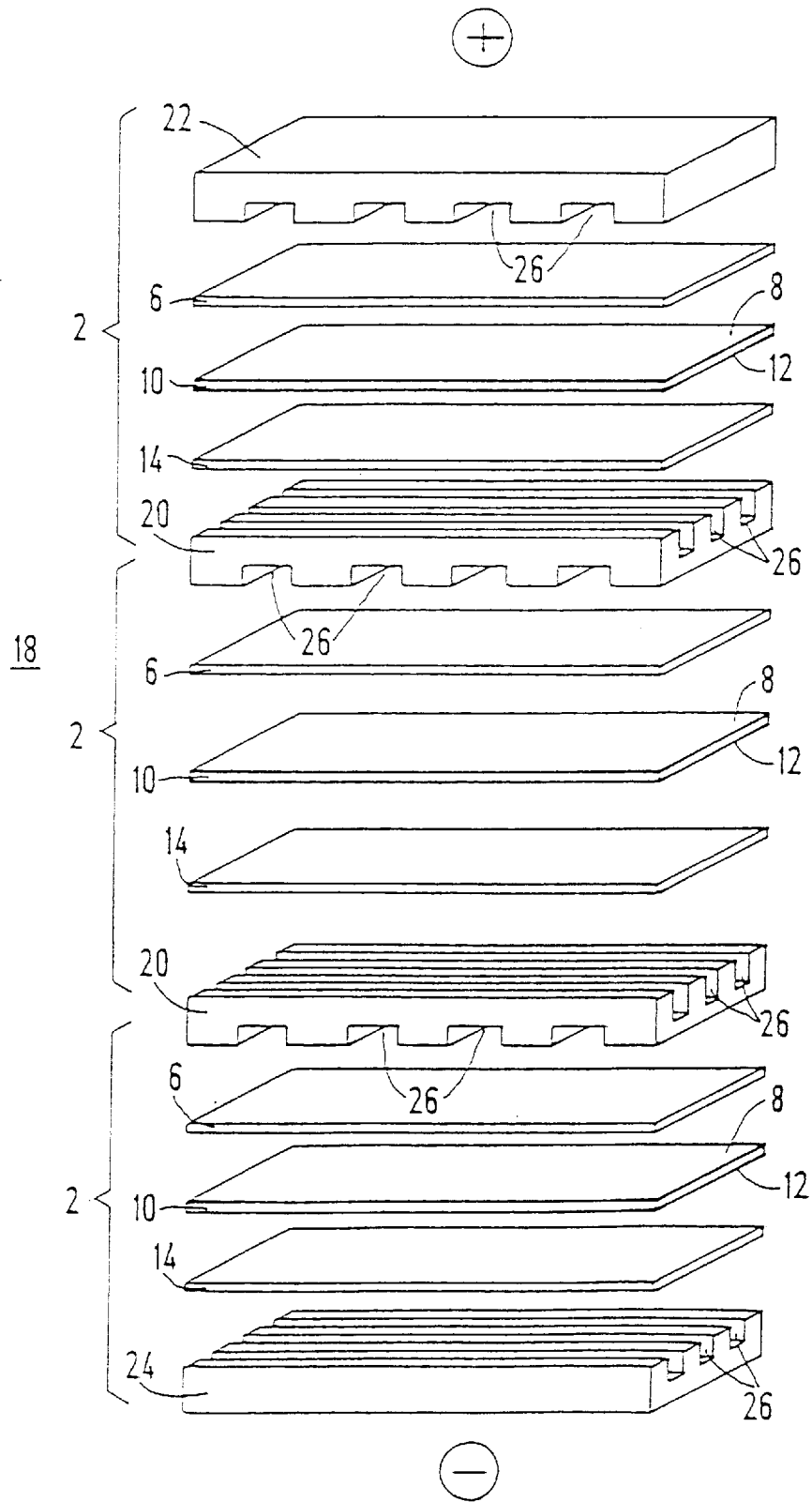
FIG. 2 is an exploded, perspective view of a high temperature fuel cell stack.

FIG. 2 shows a perspective representation of the diagrammatic structure of a high temperature fuel cell stack 18, which in this case is formed of three high temperature fuel cells 2 having the same structure as the high temperature fuel cell 2 represented in FIG. 1.

The high temperature fuel cell stack 18 is closed off at the top with an interconnecting conducting plate 22 and at the bottom with an interconnecting conducting plate 24. Other interconnecting conducting plates which are constructed as bipolar plates 20, are disposed within the high temperature fuel cell stack 18 and do not close off the high temperature fuel cell stack 18, as is the case with the interconnecting conducting plates 22 and 24.

An upper part of a given bipolar plate 20 is associated with the anode 12, and a lower part of the bipolar plate 20 is associated with the cathode 8. In this case, the cathode 8 and the anode 12 each belong to neighbouring high temperature fuel cells 2.

The bipolar plates 20 and the interconnecting conducting plates 22, 24 are each provided with channels 26 which are intended for supplying process gases to the high temperature fuel cells 2. In the case of the interconnecting conducting plates 22, 24, only one side is provided with the channels 26 in each case, whereas the bipolar plates 20 are provided on both sides with channels 26 that are directed perpendicular to one another.

We claim:

1. A high temperature fuel cell, comprising:
   at least one electrode;
   at least one interconnecting conducting plate associated with said at least one electrode; and
   a contact layer disposed between said at least one interconnecting conducting plate and said at least one electrode;
   said contact layer produced from an oxide mixed crystal powder having a spinel structure and containing chromium and a divalent element selected from the group consisting of Ti, V, Mn, Fe, Co and Cu.

2. The high temperature fuel cell according to claim 1, wherein said contact layer is a vacuum plasma sprayed layer.

3. The high temperature fuel cell according to claim 1, wherein said contact layer is a CVD applied layer.

4. The high temperature fuel cell according to claim 1, wherein said contact layer is a hydrothermal synthesis applied layer.

5. The high temperature fuel cell according to claim 1, wherein said contact layer is a sol-gel applied layer.

6. The high temperature fuel cell according to claim 1, wherein said interconnecting conducting plate is a bipolar plate.

7. A high temperature fuel cell stack, comprising a number of high temperature fuel cells, each of said fuel cells including:
   at least one electrode;
   at least one interconnecting conducting plate associated with said at least one electrode; and
   a contact layer disposed between said at least one interconnecting conducting plate and said at least one electrode;
   said contact layer produced from an oxide mixed crystal powder having a spinel structure and containing chromium and a divalent element selected from the group consisting of Ti, V, Mn, Fe, Co and Cu.

8. A method for producing a high temperature fuel cell, which comprises:
   providing at least one electrode;
   providing at least one interconnecting conducting plate associated with the at least one electrode;
   applying a contact layer between the at least one interconnecting conducting plate and the at least one electrode; and
   producing the contact layer from an oxide mixed crystal powder having a spinel structure and containing chromium and a divalent element selected from the group consisting of Ti, V, Mn, Fe, Co and Cu.

9. The method according to claim 8, which comprises applying the contact layer as ceramic powder.

10. The method according to claim 9, which comprises applying the ceramic powder by a screen-printing technique.

11. The method according to claim 9, which comprises applying the ceramic powder by wet powder spraying.

12. The method according to claim 8, which comprises placing the contact layer directly on the at least one interconnecting conducting plate.

13. The method according to claim 12, which comprises placing the contact layer on the at least one interconnecting conducting plate by vacuum plasma spraying.

14. The method according to claim 12, which comprises placing the contact layer on the at least one interconnecting conducting plate by a CVD method.

15. The method according to claim 12, which comprises placing the contact layer on the at least one interconnecting conducting plate by hydrothermal synthesis.

16. The method according to claim 12, which comprises placing the contact layer on the at least one interconnecting conducting plate by a sol-gel method.

* * * * *